Figure 1:
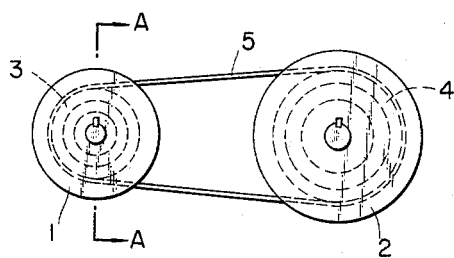

April 13, 1965  SHIZUO YAMANO  3,177,733
BELT TRANSMISSION DEVICE
Filed Feb. 26, 1962  3 Sheets-Sheet 1

INVENTOR.
Shizuo YAMANO
BY
ATTORNEY

April 13, 1965  SHIZUO YAMANO  3,177,733
BELT TRANSMISSION DEVICE
Filed Feb. 26, 1962  3 Sheets-Sheet 3

INVENTOR.
Shizuo Yamano
BY
ATTORNEY

United States Patent Office 3,177,733
Patented Apr. 13, 1965

3,177,733
BELT TRANSMISSION DEVICE
Shizuo Yamano, Tokyo, Japan, assignor to Takasago Gomu Kogyo Kabushikikaisha, Tokyo, Japan, a corporation of Japan
Filed Feb. 26, 1962, Ser. No. 175,649
Claims priority, application Japan, Oct. 19, 1961, 36/37,313
1 Claim. (Cl. 74—230.7)

The present invention relates to a novel and improved belt transmission device. More particularly, the present invention relates to a novel and improved belt transmission device having a rotary ring between the wheel and the belt.

The conventional belt transmission devices are represented by rope transmission, chain transmission, flat belt transmission, V-belt transmission, timing belt transmission, etc., and they are all composed of three parts, i.e. the main pulley fixed to the main shaft, the driven pulley fixed to the driven shaft and the belt mounted on between said two pulleys.

At present, high speed operation of all sorts of machines is desired, but this purpose cannot fully be accomplished by said belt transmission devices hitherto in use, and those concerned have come to feel dissatisfied therewith.

Originally, in order to operate the rotary parts of a machine at a high speed by a belt transmission device, the belt itself must necessarily be operated at a high speed. But, in transmitting motion from the main shaft to the driven shaft, the belt is subjected to centrifugal force, and when operating at high speed, the effect of centrifugal force upon the belt is very great; accordingly, in the conventional belt, there is a certain limit of speed according to said effect of centrifugal force, and, in order to get beyond this limit, the weight of the belt itself must be greatly reduced. But to reach the desired extreme is impossible even by using a belt material having great strength so far as the idea of conventional belt transmission devices is depended upon.

An object of the present invention is to provide a novel and improved belt transmission device overcoming the above-mentioned disadvantages.

This invention is based on the idea of using four elements, i.e. the main pulley, the driven pulley, a belt mounted on the driven pulley and a rotary ring; that is a rotary ring is used in addition to the three elements of conventional belt transmission devices, i.e. the main pulley, the driven pulley and the belt; by using a rotary ring, it is possible to provide a belt transmission system using a belt that is thin, easily flexible and light in weight and, also, to make the distance between the shafts extremely short, thereby making it possible to effect speed transmission.

That is to say, this invention relates to a belt transmission device characterized in that a rotary ring is inserted in a pulley so as to function between the pulley and the belt.

Figure 2:
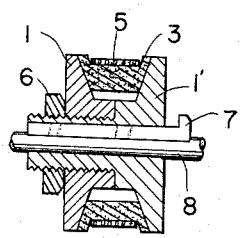
Figure 3:
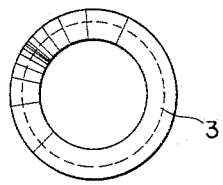
Figure 4:
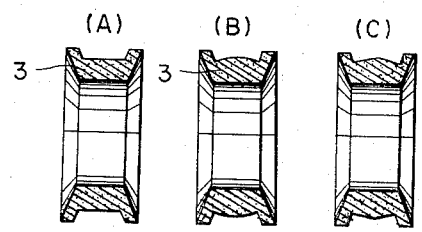
Figure 5:
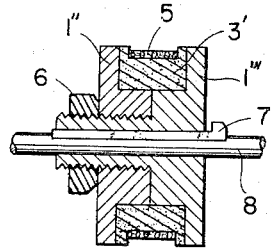
Figure 6:
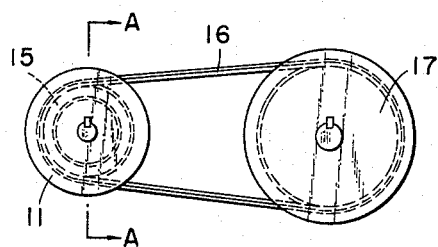
Figure 7:
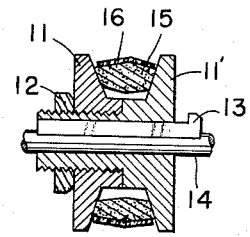
Figure 8:
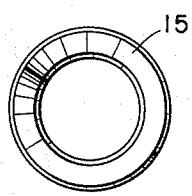
Figure 9:
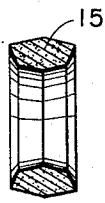
Figure 10:
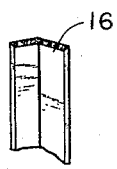
Figure 11:
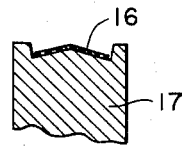
Figure 12:
Figure 13:
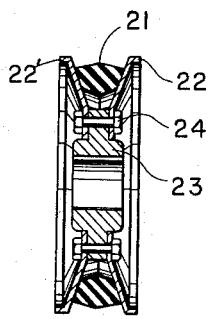
Figure 14:
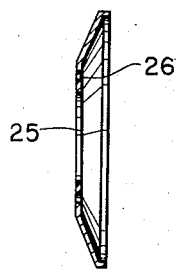
Figure 15:
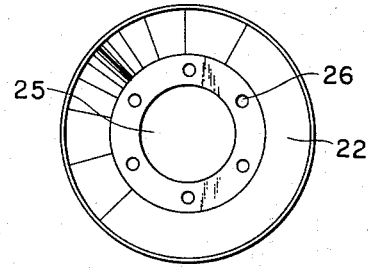
Figure 16:
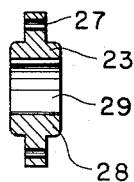
Figure 17:
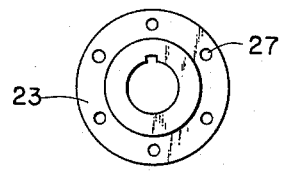
Figure 18:
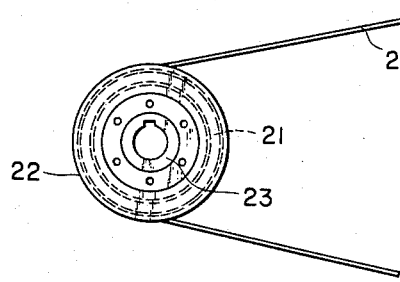
Figure 19:
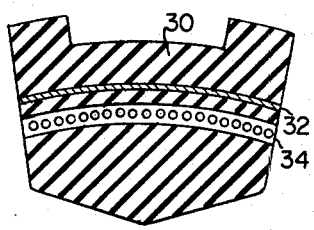

The present invention is illustrated in detail by the following drawings:

FIG. 1 is a side view of the belt transmission device;
FIG. 2 is a sectional view taken at line A—A of FIG. 1;
FIG. 3 is a side view of a rotary ring;
FIG. 4 is a sectional view thereof;
FIG. 5 is a sectional view of a belt transmission device in which a pulley and a rotary ring, each in a different shape are used.
FIG. 6 is a side view of the belt transmission device in an embodiment;
FIG. 7 is a sectional view taken at line A—A of FIG. 6;
FIG. 8 is a side view of a rotary ring;
FIG. 9 is a sectional view thereof;
FIG. 10 is a cross-sectional view of a belt;
FIG. 11 is a partial cross-sectional view of a state of the belt mounted on a pulley at the side not using the rotary ring;
FIG. 12 is a cross-sectional view of a rotary ring of different shape;
FIG. 13 shows a cross-sectional view of an assembled pulley in this invention;
FIG. 14 shows a cross-sectional view of a conical flange of this device;
FIG. 15 shows a front view of the conical flange;
FIG. 16 shows a cross-sectional view of the boss or hub part;
FIG. 17 shows a front view of the boss part;
FIG. 18 is a side view showing the state of a flat belt mounted on the channel pulley with the ring of this device; and
FIG. 19 is a cross section of a ring showing one form of reinforcement.

To explain this invention further by reference to the accompanying drawings; FIG. 1 illustrates one embodiment of the belt transmission device of this invention composed of four elements, i.e. the main shaft wheel, the driven shaft wheel, the belt and the rotary ring, wherein 1 is the main shaft pulley; 2 is the driven shaft pulley; 3 is a rotary ring inserted in the main shaft pulley; 4 is a rotary ring inserted in the driven shaft pulley; and 5 is a belt mounted on the two pulleys, and which is made extremely light in weight.

FIG. 2 is a sectional view taken at line A—A at the side of the main pulley in FIG. 1, and it shows the connection relationship between the main pulley and the rotary ring as well as between the rotary ring and the belt and the structure of the main pulley. For making it convenient to insert a rotary ring 3, the main pulley is divided at the center into two parts 1, 1', fixed by a nut 6, and, also, fixed by a key 7 to a shaft 8. Of course, the means of fixing are appropriately selected so as not to give an adverse effect upon the balance of the pulley.

The rotary ring used in this invention is shaped like a circular endless ring as shown in FIGS. 3 and 4; its external periphery is groove shaped so that the belt may be mounted and its surface contacting with the belt is made flat, arced or peaked, as shown in A, B or C, respectively in FIG. 4; and it consists of a compound of elastic materials, such as natural rubber, synthetic rubber, synthetic resin, etc., or a combination thereof with various kinds of fibers, to give it elasticity.

FIG. 19 shows a ring made of rubber or like material 30 reinforced by fibers such as a ring of cloth 32 and circumferentially extending cords 34 embedded in the rubber.

Also, the belt used in this invention is a very thin endless belt, such as, for example, that shown by 5 in FIGS. 2 and 5, being mounted in the groove of rotary ring 3, and has strong traction power. It is a flexible endless belt constructed by using steel belt, steel wire, cotton-yarn cloth, chemical fiber-yarn cloth, synthetic fiber-yarn cloth, synthetic resin or rubber or by combining them appropriately.

This invention being as stated above, when transmission is carried out in the way shown in FIGS. 1 and 2, belt 5, while it is on the main pulley 1, mounts on rortary ring 3, the same state as if a V-belt were on a grooved pulley, the rotary ring 3 being wedged in between pulleys 2, 2' and coming in close contact therewith completely by the wedging action due to pressure based on the tension of belt 5, and belt 5 and rotary ring 3 acting almost in one body due to a great friction coefficient therebetween. Next, from the time the belt 5 parts from the pulley to the time it gets in the next pulley, it acts like a mere flat belt, being completely separated from the rotary ring 3, and, as stated above, the belt is very thin, so it is flexible and can be made very light in weight.

That is to say, the belt 5 can be made light in weight to the extent equal to the weight of the traction part in a V-belt. Accordingly, it is possible to operate the belt at a high speed, and as the belt is made very thin, it becomes also possible to make the pulley extremely small in diameter.

Also, when the belt 5 parts from the pulley, unlike when a V-belt gets out of the wedged state, no power at all is required, so that the transmission efficiency thereof is very high, and because it involves no cause for generation of heat, the life thereof becomes very long.

Incidentally, because the belt transmits the rotatory power through the rotary ring without coming in direct contact with the pulley, the variation in torque due to the pulley is absorbed in the rotary ring which is an elastic body, that is, the anti-vibration effect can also be expected to a high extent. Furthermore, because the belt is light in weight, it gives less vibration to the machine, and, accordingly, it can be used as a transmission device for precision machines.

FIG. 5 illustrates a modification of the rotary ring mentioned above, wherein the shape of the rotary ring is not such as being wedged in between pulleys 1 and 1', but the material of the rotary ring is sufficiently elastic to be deformable, thereby the similar effect as the wedging action is produced.

In a specifical aspect, this invention relates to a belt transmission device characterized in that a rotary ring whose external peripheral surface is in the shape of a convex arc or an inverted, wide-angle V in cross sectional planes through its axis of rotation, is inserted in the wheel, and a belt is used having a cross-sectional shape complementary to, and fitting, that of the rotary ring. Such a belt, for example, may have a transverse section in the form of an inverted, side-angle V. Alternatively, the belt may be thin and rectangular in cross section.

To explain this further by reference to the accompanying drawings: FIG. 6 illustrates one embodiment of the belt transmission device of this invention composed of four elements, i.e. the main pulley 11, the driven pulley 17, without a rotary ring, belt 16, and rotary ring 15 of pulley 11. Belt 16 is made extremely light in weight and has the aforesaid cross section of a wide-angle inverted V.

FIG. 7. is a sectional view taken at line A—A of FIG. 6, and it shows the relationship between the main pulley and the rotary ring as well as between the rotary ring and the belt and the structure of the main pulley. For making it convenient to insert a rotary ring 15, the main pulley is divided at the center into two parts 11, 11', fixed by a nut 12, and, also fixed by a key 13 to a shaft 14. Of course, the place of division into 11, 11' and the means of fixing are appropriately selected so as not to give an adverse effect upon the balance of the pulley.

The rotary ring used in this embodiment is shaped like a circular endless ring, its section being shown in FIG. 8; its external periphery is as shown, in the form of a flattened hexagon symmetrical about a vertical central plane of the ring. Alternatively this ring may have the cross-sectional shape somewhat like an inverted T, or channel-shaped, as desired. The ring is formed of elastic materials, such as natural rubber, synthetic rubber, synthetic resin, etc., or a combination thereof with various kinds of fibers, and it has a required elasticity. Incidentally, horizontal grooves, etc., not shown, may optionally be provided on the surface of the external peripheral surface of the rotary ring for the purpose of preventing slipping relatively to the belt.

Also, the belt used in this invention is a very thin endless belt, such as, for example, that indicated at 16 in FIGS. 7, 8, 10 and 11. The belt has a section in the form of a wide-angle inverted V, to correspond to the cross sectional form of rotary ring 15. When mounted in close contact with the rotatry ring, the belt has strong traction power. It is a flexible endless belt constructed by using steel belt, steel wire, cotton-yarn cloth, chemical fiber-yarn cloth, synthetic fiber-yarn cloth, synthetic resin or rubber or by combining them appropriately.

FIG. 11 shows a belt 16 mounted directly on the driven pulley 17 without a rotary ring, the central part of the driven pulley having a shape to correspond with the inverted wide-angle V shape of the belt. When transmission is carried out in the way shown in FIGS. 6 and 7, belt 16, while passing about main pulley 11, contacts rotary ring 15, the same as if a V-belt were on a grooved pulley, the rotary ring 15 being wedged in between the sections 11, 11' of the pulley and coming in close contact therewith. Due to the wedging action caused by tension of belt 16, the belt and ring act almost as one body due to a great friction coefficient therebetween. From the time the belt 16 separates from the pulley to the time it gets in the driven pulley, it acts like the usual flat belt. The belt is very thin, so it is flexible and can be made very light in weight.

That is to say, the belt 16 can be made light in weight to the extent equal to the weight of the traction part in a V-belt. Accordingly, it is possible to operate the belt at a high speed, and as the belt is made very thin, it becomes also possible to make the pulley extremely small in diameter.

When the belt 16 separates from the pulley, unlike when a V-belt separates from its pulley, no power at all is required, so that the transmission efficiency hereof is very high, and because it involves no cause for generation of heat, the life thereof becomes very long.

Incidentally, because the periphery of the rotary ring is in the cross-sectional form of an inverted T with the central leg being peaked, there is the advantage that the belt can always be let to run at the center even if the two shafts are somewhat out of parallel or even when the distance between the two shafts is extremely short. Further, because the belt transmits the rotatory power through the rotary ring without coming in direct contact with the shaft wheel, the variation in torque due to the shaft wheel is absorbed in the rotary ring which is an elastic body, that is, the antivibration effect can also be expected to a high extent. Furthermore, because the belt is light in weight, it gives less vibration to the machine, and, accordingly, it can be used as a transmission device for precision machines.

FIG. 12 illustrates a modification of the rotary ring wherein the periphery of the rotary ring is arcuate in cross-section and the effect thereof is the same as that of the rotary ring having a section as in FIG. 9.

In the construction just described the driving pulley only is provided with a rotary ring, but it will be understood that the driven pulley as well, may be provided with such a ring, with corresponding advantages.

FIG. 6 illustrates the case in which but one driven pulley is used, but it will be understood that the same advantages are obtained when the belt passes about two or more driven pulleys.

Even although belt 16 is initially flat in cross-section, when used for a time with one or more pulleys having peaked axial sections, it gradually assumes the same sectional form as the pulleys. Thus it is not absolutely essential that the belt be initially in the cross-sectional form of a wide-angled inverted V.

Further, this invention includes the construction of an assembled pulley including an elastic ring provided so that transmission can be effected by a flat belt mounted on a V-shaped channel pulley, being illustrated by reference to the drawings:

FIG. 13 illustrates one embodiment of the assembled pulley of this invention, wherein 21 is an elastic ring; 22 and 22' are opposing conical sections or flanges and 23 is the hub to which pulley flanges 22, 22' are fixed. FIG. 14 and FIG. 15 show a cross-sectional view and a front view respectively, of one of the two duplicate flanges. From these figures it is noted that each is provided, at its center, with a hole 25 and with an appropriate number of circumferentially-spaced holes 26.

FIG. 16 and FIG. 17 illustrate the hub 23, shown as having a shaft hole and a key groove at its center. The ends of the hub are sized to have a smooth fit within the hole 25 of a respective one of the two flanfes 22, said hub being further provided with a series of holes 27, equal in number and spacing to holes 26 of flanges 22 and 22' for fixing the flanges to the hub, as by means of bolts and nuts 24. The hub may be fixed to its shaft by means of a key or by any other appropriate means.

Ring 21 is an elastic ring, and is inserted between the conical flanges 22, 22' and fixed by bolt-nut 24 as one body. A spring washer should be used so that the nut does not loosen while in operation.

Incidentally, the elastic ring 21 is inserted between 22 and 22' by leaving a narrow gap space so that the ring is movable even after assembly.

When the pulley assembled as above is used with the main driving shaft or the driven shaft or both, the pulley itself acts as a V-belt channel pulley, and since a completely flat belt can be used, it is possible to obtain transmission of high efficiency at a very high speed.

Also, the assembled pulley of this invention can be manufactured economically, being divided into the conical flanges, the elastic ring part, the hub part, etc., and, because each part can be manufactured efficiently and at a moderate price, it is possible to prepare the pulley of this invention very economically and precisely as a whole. Accordingly, the pulley of this invention is very effective for use as a fan pulley for automobiles etc., which are produced in large quantities.

The pulley flanges may be made from a wide variety of materials other than metal, such as reinforced plastic, etc., which is very light in weight and has great strength.

Further, in one embodiment of this invention, a flat belt is used as the belt, a metal-made channel pulley for V-belt use is used as the pulley, and, in order to make the driving of said pulley possible, an elastic ring is used as the direct contactor with the flat belt.

FIG. 18 shows a flat belt 25 mounted on the surface of said ring to effect transmission.

As shown upon FIG. 13, ring 21 does not contact the periphery of hub 23, so that there is an annular space between them. Thus the action is similar to that of a V-belt in its groove in a pulley, in that the ring is compressed and urged into the pulley channel as the belt passes thereabout. The periphery of the ring 21 may be peaked as shown or flat, and may be provided with axially-extending, circumferentially-spaced indentations or grooves to prevent slip between the ring and belt. Incidentally the shape of the internal peripheral surface may be varied widely. Any shape, such as that shown in FIG. 14, or a channnel or concavely arcuate shape, etc. may be adopted to accomplish the object of this invention.

The material of the transmission ring is a compound of a natural rubber or synthetic rubber, synthetic resin, synthetic fiber or a mixture thereof, and any material which has the required elasticity may well be used to accomplish the object of this invention.

When a transmission ring of the type mentioned above is used, it is possible to have the belt operate as a V-belt on the pulley and as a completely flat belt after parting from the pulley. Accordingly, by use of the transmission ring of this invention, it is possible to obtain the same effect as a V-belt by using a flat belt, yet this flat belt is durable for use for a long time, making it possible to effect very effective transmission.

Incidentally, it is possible to effect transmission by inserting the transmission ring of this invention in both the pulley on the main driving side or the pulley on the driven side, or by inserting said ring in either one of said two pulleys and using a flat pulley at the other side.

Although FIG. 13 shows the pulley in knock-down or take-apart form, it may be made in one integral part. Ring 21 is then made with sufficient stretch to enable it to be expanded over the pulley flange and thereafter to contact into position between flanges, into the position shown.

With these and further objects in view, as may become apparent from the within disclosure, the invention consists not only in the structure herein pointed out, but includes further methods, apparatus and structures coming within the scope of what may be claimed.

I claim:

A power transmission pulley comprising tapered flanges secured in spaced relation to define a V groove therebetween, a resilient ring of rubber combined with fibers mounted between the flanges, spaced flanges integral with the ring in contact with the tapered flanges and defining therebetween a belt receiving groove.

References Cited by the Examiner

UNITED STATES PATENTS

| | | | |
|---|---|---|---|
| 315,347 | 4/85 | Schroder | 74—230.05 X |
| 948,091 | 2/10 | Geer. | |
| 1,217,270 | 2/17 | Cahill | 74—230.7 |
| 1,728,372 | 9/29 | Shields | 74—230.5 X |
| 1,863,822 | 6/32 | Avilla | 74—230.5 X |
| 2,254,380 | 9/41 | Mitchell | 74—230.17 |
| 2,333,387 | 11/43 | Parvin | 74—230.05 X |
| 2,632,550 | 3/53 | Panter | 74—230.7 X |
| 2,747,420 | 5/56 | Beck | 74—229 X |
| 2,970,867 | 2/61 | Ruf | 74—230.7 |

FOREIGN PATENTS 1,098,129   3/55   France.

DON A. WAITE, *Primary Examiner.*

MILTON KAUFMAN, ROBERT C. RIORDON,
*Examiners.*